(12) United States Patent
Sneddon (10) Patent No.: US 9,816,378 B1
(45) Date of Patent: Nov. 14, 2017

(54) PNEUMATIC COMPRESSOR/MOTOR

(71) Applicant: Exelis Inc., McLean, VA (US)

(72) Inventor: Keith C. Sneddon, Sayville, NY (US)

(73) Assignee: Harris Corporation, Melbourne, FL (US)

( * ) Notice: Subject to any disclaimer, the term of this patent is extended or adjusted under 35 U.S.C. 154(b) by 302 days.

(21) Appl. No.: 13/843,456

(22) Filed: Mar. 15, 2013

(51) Int. Cl.
F01B 25/00 (2006.01)
F01B 17/02 (2006.01)
F02C 6/16 (2006.01)

(52) U.S. Cl.
CPC .............. *F01B 25/00* (2013.01); *F01B 17/02* (2013.01); *F02C 6/16* (2013.01); *Y02E 10/46* (2013.01); *Y02E 20/14* (2013.01); *Y02E 60/142* (2013.01); *Y02E 60/145* (2013.01); *Y02E 60/15* (2013.01)

(58) Field of Classification Search
CPC ....... Y02E 60/15; Y02E 10/46; Y02E 60/142; Y02E 60/145; Y02E 20/14; F01B 25/00; F01B 17/02; F02C 6/16
USPC ........... 60/659, 382; 180/165, 302, 303, 304
See application file for complete search history.

(56) References Cited

U.S. PATENT DOCUMENTS

| | | | | |
|---|---|---|---|---|
| 2,696,343 A * | 12/1954 | Mallory | ................... | F02B 33/18 123/55.4 |
| 3,143,850 A * | 8/1964 | Foster | ............................... | 60/598 |
| 3,986,575 A * | 10/1976 | Eggmann | ................. | B60K 3/04 180/301 |
| 4,018,050 A * | 4/1977 | Murphy | .................... | F01B 1/02 60/370 |
| 5,960,756 A * | 10/1999 | Miyachi et al. | ........... | 123/90.16 |
| 7,231,998 B1 * | 6/2007 | Schechter | ...................... | 180/165 |
| 7,789,181 B1 * | 9/2010 | Schechter | ...................... | 180/165 |
| 2010/0257862 A1 * | 10/2010 | Howes | ...................... | F01K 3/12 60/682 |
| 2011/0094231 A1 * | 4/2011 | Freund | ............................ | 60/727 |
| 2012/0055145 A1 * | 3/2012 | Blieske | ..................... | F02C 6/16 60/327 |

OTHER PUBLICATIONS

Unpublished U.S. Appl. No. 13/043,091, filed Mar. 8, 2011.

* cited by examiner

*Primary Examiner* — Mark Laurenzi
*Assistant Examiner* — Wesley Harris
(74) *Attorney, Agent, or Firm* — Edell, Shapiro & Finnan LLC (57) ABSTRACT

A compressor/motor has fluid processing stages, each having ports through which a fluid is accepted in one volume and expelled in another volume. A system of valves selectively couples the ports to define, for a first process of a cycle, a unidirectional fluid path through the fluid processing stages that expels the fluid from path-adjacent fluid processing stages in incrementally smaller volumes. In a second process of the cycle, a reverse unidirectional fluid path is defined by the valves where the fluid expelled from path-adjacent fluid processing stages is in incrementally larger volumes. A mechanical interface coupled to the fluid processing stages conveys a force to the fluid processing stages to compel the fluid through the fluid path in the first process or conveys the force from the fluid processing stages that is compelled by the fluid traversing the reverse fluid path.

19 Claims, 8 Drawing Sheets

PNEUMATIC COMPRESSOR/MOTOR

TECHNICAL FIELD

The present general inventive concept relates to a reversible pneumatic compressor/motor.

BACKGROUND

Energy recovery, as used herein, encompasses a variety of techniques by which energy is transferred from one subsystem of a larger system to another in order to minimize the amount of energy that must be input to the system for it to perform its function. Energy recovery systems are being developed to counter increasing energy costs and to reduce pollutants and greenhouse gasses. Certain of these energy recovery techniques are referred to as "regenerative," meaning that energy is stored and then reapplied to do work. The most widespread example of this technology can be found in braking regeneration systems. These systems produce energy during braking in a way that can be readily stored, e.g., as electrical energy or hydraulic compression, as opposed to employing friction to brake, which generates heat that is usually just released into the brake's surroundings. The stored energy can be used to later supplement engine power, thereby effecting an improvement in overall fuel efficiency.

Recent advances in high pressure (6000-8000 psi), ruggedized, safe pneumatic components and subsystems have made pneumatic energy recovery a practical option, in many cases compressed air is used both as the energy storage medium and the working medium. Pneumatic energy recovery systems are generally smaller, lighter, and simpler than either of their electric or hydraulic counterparts.

A pneumatic energy recovery system, in its purest sense, has an optimized air compressor to store energy in the form of compressed air and a complementary air motor that operates on the expansion of air so as to utilize the stored energy in the compressed air to do work. The optimal configuration is a unified compressor and motor that can run in both directions, i.e., as a compressor and a motor, to implement thermodynamically reversible processes to the fullest extent practicable. Efforts to achieve an efficient thermodynamically reversible compressor/motor have been ongoing.

SUMMARY

A compressor/motor has fluid processing stages, each having ports through which a fluid is accepted in one volume and expelled in another volume. A system of valves selectively couples the ports of the fluid processing stages to define, in one process of a cycle, a unidirectional fluid path through the fluid processing stages such that the volume expelled from path-adjacent fluid processing stages is made incrementally smaller. The valves also define, in another process of the cycle, a reverse unidirectional fluid path through the fluid processing stages by which the volume expelled from path-adjacent fluid processing stages becomes incrementally larger. A mechanical interface is coupled to the fluid processing stages to convey a force to the fluid processing stages that compels the fluid through the fluid path in the first process and, during the other process, the mechanical interface conveys the force from the fluid processing stages that is compelled by the fluid traversing the reverse fluid path.

These and other objects, features and advantages of the present general inventive concept will be apparent from the following detailed description of illustrative embodiments thereof, which is to be read in connection with the accompanying drawings.

DESCRIPTION OF EXAMPLE EMBODIMENTS

The present general inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary, when used herein, is intended to mean "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Figure 1A:
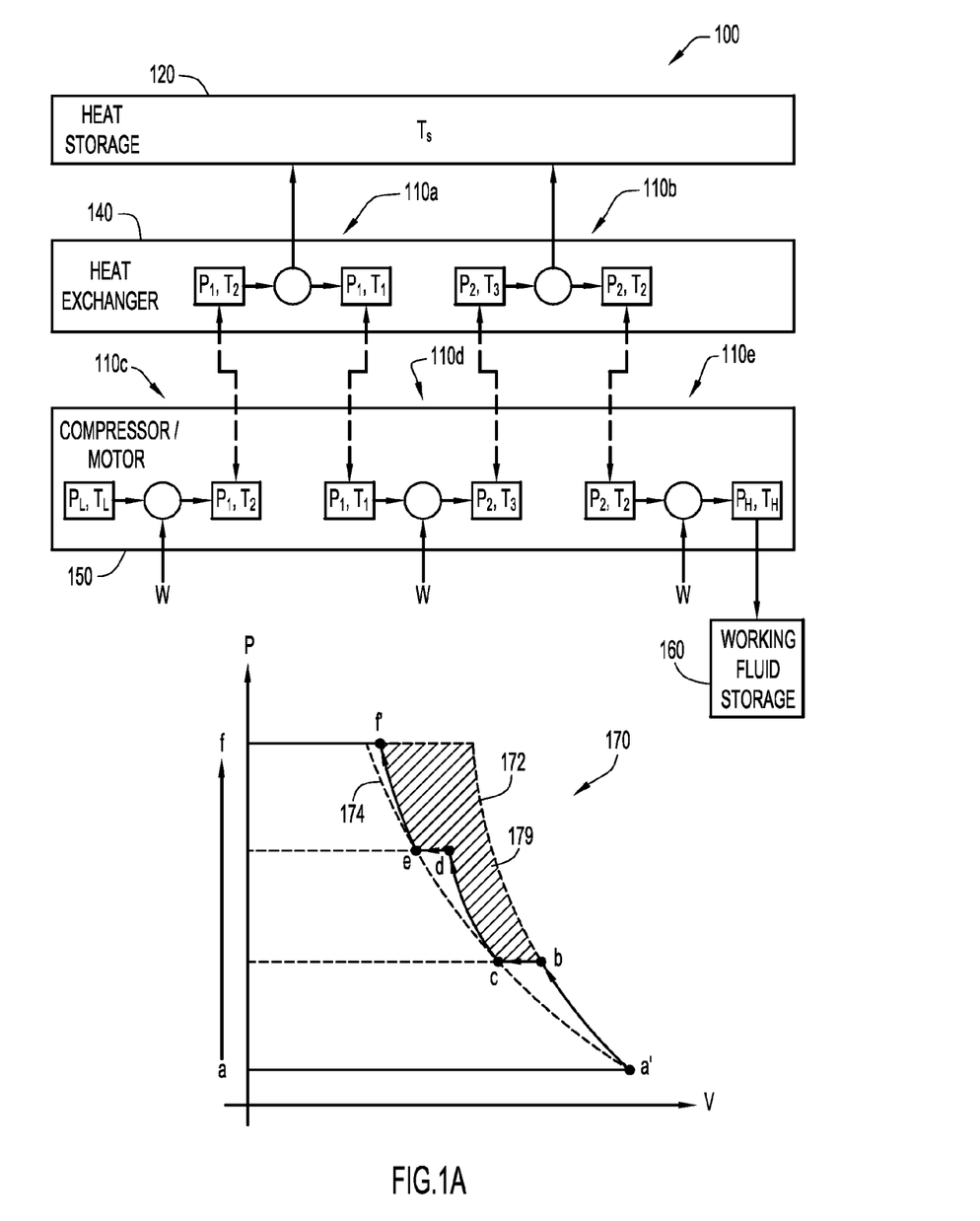
FIGS. 1A-1B are functional diagrams illustrating energy recovery implemented in embodiments of the present general inventive concept.
Figure 1B:
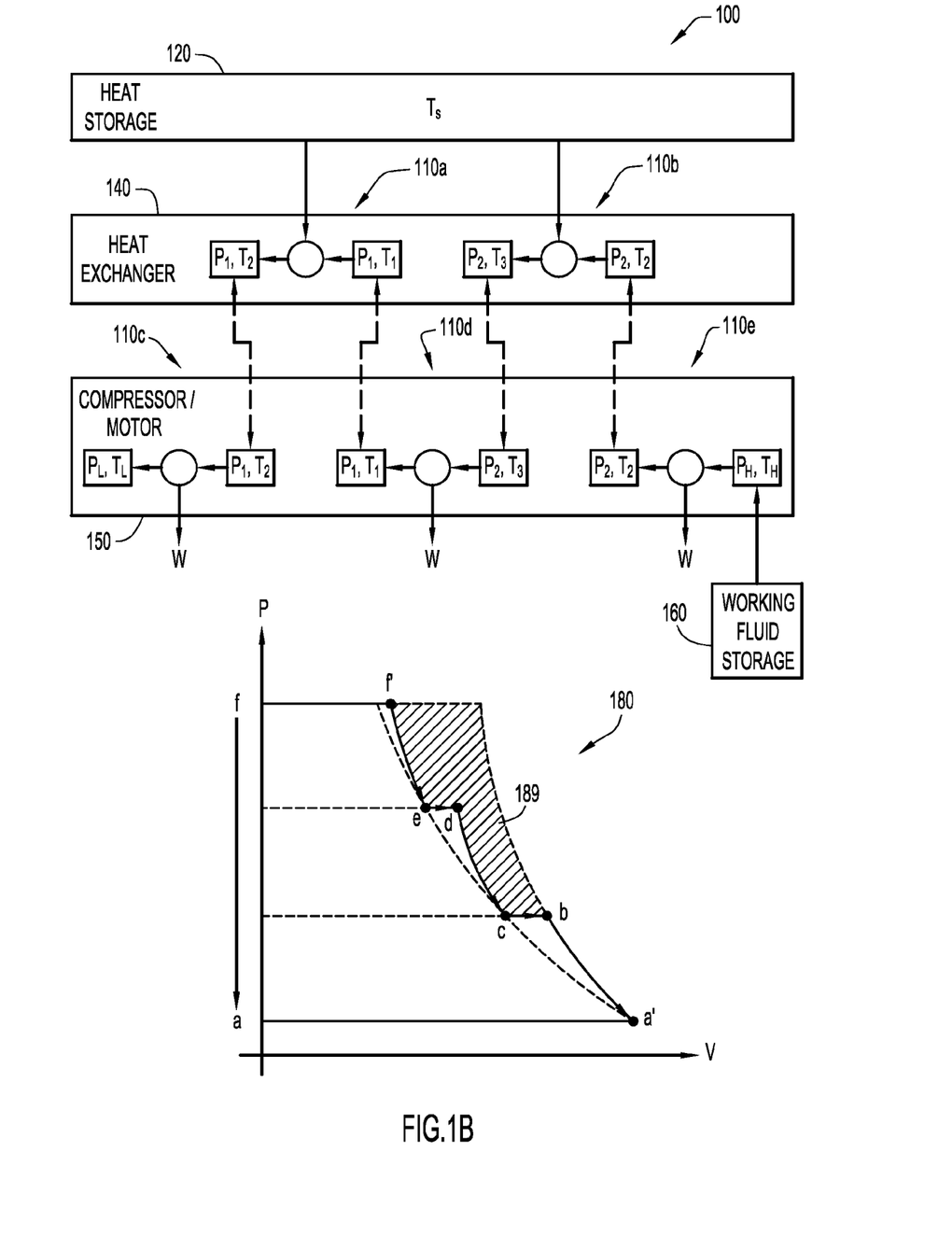

FIGS. 1A-1B are illustrations of an energy recovery system 100 that may be implemented by embodiments of the present invention. Broadly, energy recovery system 100 can be viewed as being carried out by a plurality of thermodynamic engines 110a-110e, representatively referred to herein as thermodynamic engine(s) 110, which, as used herein, is an abstraction to refer to any mechanism by which a change in a thermodynamic state, e.g., pressure, volume, temperature, etc., is effected through a transfer of energy, either as heat or by work. While thermodynamic engines 110 are illustrated to have similar appearance and are referenced in the illustration by common numeric indicators, thermodynamic engines may each operate under different process variables by entirely different mechanisms. The present invention is not limited to any particular physical manifestation of thermodynamic engines 110; the skilled artisan will recognize numerous possible mechanisms that can be used to embody the present invention without departing from its intended spirit or scope. Indeed, it is to be understood that the use of the word "engine" is not strictly intended to mean "heat engine" in the traditional sense, although such an implementation of thermodynamic engines 110 is one possibility.

Thermodynamically, energy recovery system 100 is an open system where, in one process, i.e., that illustrated in FIG. 1A, work is done on the system, such as by a shaft of compressor/motor 150 being externally driven, to compress a working fluid and to store the compressed fluid in a suitable working fluid storage facility 160. In another process, i.e., the internal energy of the compressed working fluid stored in working fluid storage 160 is used by energy recovery system 100 to do work on its surroundings, such as to drive the shaft of compressor/motor 150. Accordingly, the process illustrated in FIG. 1A will be referred to as occurring while energy recovery system 100 is in compressor mode while the process illustrated in FIG. 1B will be referred to as occurring while energy recovery system 100 is in motor mode. However, this nomenclature is not intended to restrict the present invention to a particular application.

As illustrated in FIGS. 1A-1B, collectively referred to herein as FIG. 1 where no distinction is necessary, energy recovery system 100 is realized through a few basic components: compressor/motor 150, heat exchanger 140, heat storage facility 120 and working fluid storage facility 160. Again, these components are abstractions that can be physically realized in a number of different ways, as the ordinarily skilled artisan will recognize and appreciate upon review of this disclosure. Compressor/motor 150 converts energy from mechanical work W to compress a working fluid from a low pressure $P_L$ to a high pressure $P_H$, and to store the high pressure working fluid in working fluid storage 160. This change in pressure carries with it a change in temperature from a low temperature $T_L$ to a high temperature $T_H$. Heat exchanger 140 minimizes the difference between temperatures $T_L$ and $T_H$ by transferring heat to heat storage unit 140 to raise the temperature $T_S$ of a heat storage medium. As will be discussed in detail below, minimizing the difference between temperatures $T_L$ and $T_H$ can improve the efficiency of compressor/motor 150. In the reverse operation, the pressure of the working fluid stored in working fluid storage 160 is reduced from $P_H$ to $P_L$ in compressor/motor 150 to perform work W, which also causes a change in temperature from $T_H$ to $T_L$. Heat exchanger 140, to likewise improve efficiency, transfers heat to compressor/motor 150 to minimize the difference between temperature $T_H$ and $T_L$. Of course, this description, as well as others herein, excludes consideration of system losses, but such losses are readily recognized by the skilled artisan and discussion of such is not necessary to practice the invention through its many possible embodiments. It is to be understood, however, that many modifications to embodiments described herein may be realized to minimize such system losses and other non-ideal behavior and the scope of the present invention is intended to encompass such variations.

Referring to FIG. 1A, thermodynamic process 170 is described for compressor mode operation of energy recovery system 100. Process 170 increases the pressure of the working fluid from $P_L$, indicated in the pressure-volume (PV) state diagram at 170a, to a pressure $P_H$ indicated at 170f. In the illustrated embodiment, this change in pressure is achieved in stages, represented by thermodynamic engines 110c-110e by mechanical work W. It is to be understood that while only three stages are illustrated, the present invention is not so limited. Additionally, while is it illustrated that work W is done on each stage 110c-110e, such work may be derived from a common mechanism.

In stage 110c, work is done on the working fluid to increase the pressure by an increment $\Delta P_c = P_1 - P_L$, corresponding to path 170a' to 170b in process 170, where the subscript on the increment notation refers to the thermodynamic engine 110 by which the increment is achieved. The increase in pressure causes an incremental increase in temperature $\Delta T_c = T_2 - T_L$. Thermodynamic engine 110a in heat exchanger 140 transfers heat from the working fluid to the heat storage medium in heat storage 120 to reduce the temperature by an increment $\Delta T_a = T_1 - T_2$, which, to be noted, is a negative value. If held at constant pressure, this change in temperature $\Delta T_c$ compels a change in volume of the working fluid, by which less effort is required to transfer the working fluid into a smaller working volume of subsequent compressor stage 110d. The skilled artisan will recognize this process as similar to "intercooling" in a multi-stage compressor. The change in temperature and corresponding change in volume occur nearly isobarically, as illustrated at process path 170b-170c. Compression/heat exchange processes similar to that just described are performed in process 170 to obtain a final working fluid pressure. That is, a change of pressure $\Delta P_d = P_2 - P_1$ and temperature $\Delta T_d = T_3 - T_1$ may be brought about at stage 110d, as indicated at process path 170c-170d. Subsequently, a change in temperature $\Delta T_b = T_2 - T_3$ is achieved by heat transfer in thermodynamic engine 110b, which causes a decrease in volume of the working fluid. This concurrent change of thermodynamic state is indicated at process path 170d-170e. The working fluid is compressed to its final pressure $P_H$ by a incremental increase $\Delta P_e = P_H - P_2$ and increase in temperature $\Delta T_e = T_H - T_2$, as indicated at process path 170e-170f. The working fluid may then be transferred at this pressure $P_H$ and temperature $T_H$ to working fluid storage 160.

As stated above, minimizing the difference between temperatures $T_H$ and $T_L$ may improve the efficiency of energy recovery system 100. In the PV diagram of FIG. 1A, curve 172 indicates an adiabatic path that might be traversed without the multistage compression/intercooling operation described above and curve 174 indicates a isothermal path that might be traversed in an ideal case. The difference between these two paths represents the difference between the amount of work that must be done to achieve the same final pressure. Thus, the shaded area 179 corresponds to an amount of work that need not be done on energy recovery system 100 as compared to a system in which a single stage compressor might be employed.

With reference to FIG. 1B, motor mode process 180 of energy recovery system 100 is essentially the reverse of process 170 and, ideally if such were possible, would be exactly the reverse process. In the exactly reverse process, energy system 100 would be capable doing the same work for a given amount of pressurized working fluid that was done on the system to store that amount of working fluid. For purposes of understanding the basic principles of the processes of the energy recovery cycle, which consists of process 170 and complementary process 180, embodiments of the present invention seek to implement motor mode process 180 as the reverse of compression mode process 170 to the extent possible and, as such, the explanation of motor mode process will be abbreviated. The ordinarily skilled artisan will recognize and appreciate the impediments to achieving the perfectly reverse thermodynamic path without an accounting thereof in the present explanation.

Motor mode process 180 converts the energy stored as pressure of the working fluid stored in working fluid storage 160 to kinetic energy of work W. Thus, at the completion of the process, the pressure of the working fluid drops from pressure $P_H$, indicated at state 180*f* in the PV diagram, to a pressure $P_L$ indicated at state 180*a*. The work is done over stages by thermodynamic engines 110*c*-110*e*, such as by incrementally rotating a shaft by means of a crankshaft, although the present invention is not so limited. In complementary fashion to the volumetric compression by heat transfer between each stage 110*c*-110*e*, a volumetric expansion occurs in motor mode process 180 by transferring heat from heat storage 120 to the working fluid through thermodynamic engines 110*a*-110*b* as the working fluid proceeds through stages 110*c*-110*e*. Thus, in a reverse manner to that explained above, stages 110*e*-110*c* do work through volumetric expansion with a corresponding drop in pressure and temperature as indicated at paths 180*f*-180*e*, 180*d*-180*c* and 180*b*-180*a*', respectively. In concert with the transfer of the working fluid through stages 110*e*-110*c*, thermodynamic engines 110*b*-110*a* add heat to the working fluid to cause isobaric expansion of the working fluid as indicated at paths 180*e*-180*d* and 180*c*-180*b*.

Figure 2:
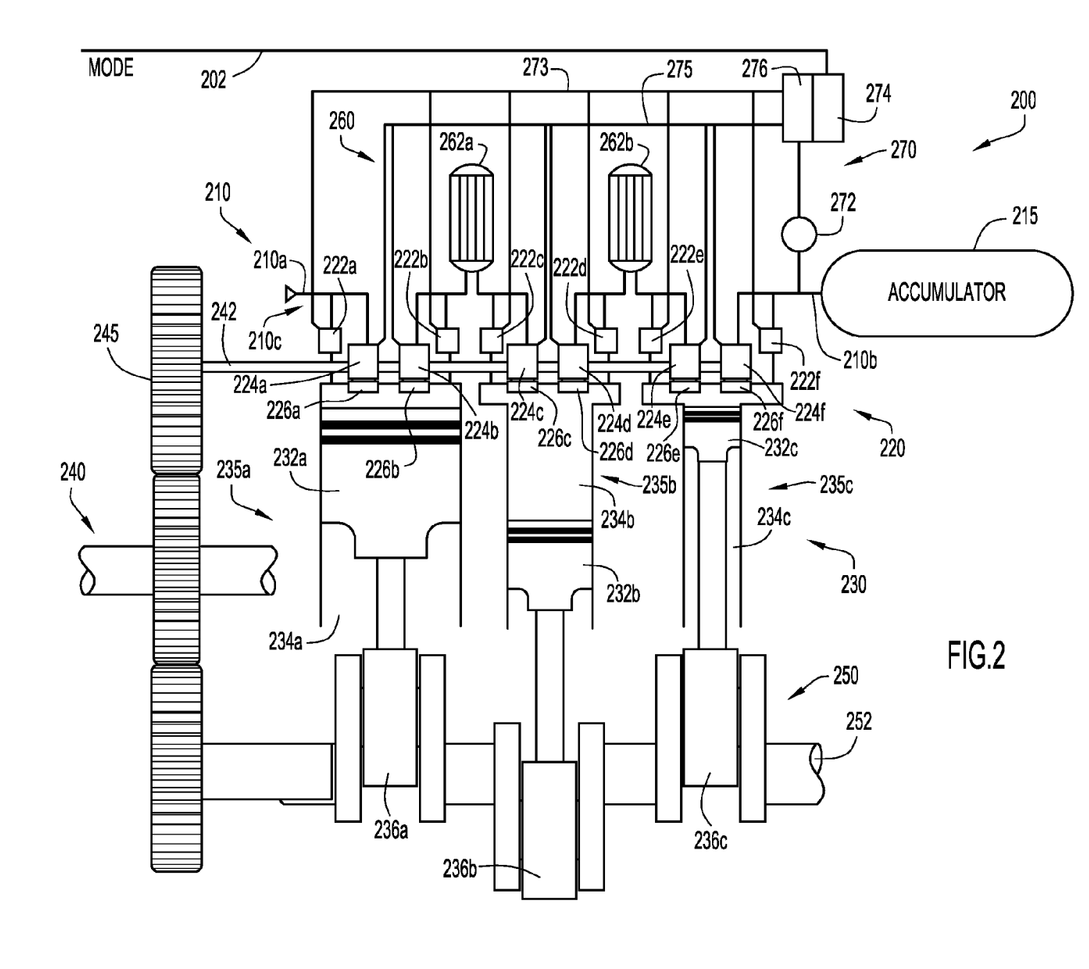
FIG. 2 is a schematic block diagram of a compressor/motor by which the present general inventive concept can be embodied.

FIG. 2 is a schematic block diagram of an exemplary compressor/motor 200 by which the present general inventive concept can be embodied. Compressor/motor 200 is aptly used in an energy recovery system in that its forward and reverse processes, i.e., compression and expansion or vice-versa, on a working fluid serving also as the energy storage medium proceed along a thermodynamically reversible process path to the maximum extent possible by such a system. That is, embodiments of the present invention, such as compressor/motor 200, seek to do the same amount of work from energy that compressor/motor 200 stored in a compressed fluid that was done on compressor/motor 200 to store that energy, i.e., by compressing and storing that fluid.

For purposes of explanation and not limitation, compressor/motor 200 will be described in the context of its interoperating subsystems: working fluid service 210, valve system 220, fluid processing system 230, timing drive 240, mechanical interface 250, thermal management system 260 and control system 270. Working fluid service 210 carries the working fluid through compressor/motor 200 and includes an inlet/exhaust port 210*a* through which low pressure fluid is input and expelled, an accumulator port 210*b* through which high pressure fluid is stored and drawn, an accumulator 215 in which compressed fluid is stored and piping system 210*c* to transport the working fluid between components of compressor/motor 200.

Thermal management system 260 is configured to mitigate temperature changes owing to the compression and expansion of the working fluid. A change in air pressure, for example, sufficient to do work by compressor/motor 200 can cause sudden and drastic temperature changes in the working fluid. Repeated thermal shock from these temperature fluctuations can result in serious equipment damage that, in a catastrophic case, can be harmful to personnel. In exemplary compressor/motor 200, thermal management system 260 is incorporated to not only mediate these changes in temperature for reasons of safety, but also to promote more efficient fluid processing, as discussed above with reference to FIG. 1. Thermal management system 260 may include one or more heat exchangers 262*a*-262*b*, representatively referred to herein as heat exchanger(s) 262, to remove heat from the working fluid during compression and to add heat to the working fluid during expansion. The present invention is not limited to a particular thermal management technique, although added efficiency may be obtained by deploying a thermal energy recovery process, as discussed above with reference to FIG. 1, such as that described in Applicant's co-pending patent application Ser. No. 13/798,259, entitled, "Thermal Energy Recovery," the full disclosure of which is incorporated herein by reference.

At the core of compressor/motor 200 is the fluid processing system 230 which serves to contain, process and transport the working fluid during the energy recovery cycle. Exemplary compressor/motor 200 implements a piston/cylinder configuration to do the fluid processing; however the present invention is not so limited. As is illustrated, fluid processing system 230 comprises three (3) fluid processing stages 235*a*-235*c*, representatively referred to herein as fluid processing stage(s) 235. It is to be understood, however, that while only three fluid processing stages 235 are illustrated and described in this example embodiment, the present invention may be embodied in any number of such stages without departing from the spirit and intended scope thereof.

Fluid processing stages 235 have respective pistons 232*a*-232*c*, representatively referred to herein as piston(s) 232, and respective cylinders 234*a*-234*c*, representatively referred to herein as cylinder(s) 234. The fluid capacity, or displacement, of each fluid processing stage 235 is a function of its bore diameter and its stroke and these parameters may be prudently selected to define a specific path in thermodynamic state space. As was discussed with reference to FIG. 1, compression and expansion of the working fluid may be done incrementally across multiple stages and the displacement of each fluid processing stage 235 may be a design parameter by which a target incremental compression/expansion profile can be specified and achieved.

Fluid processing stages 230 are mechanically coupled to mechanical interface 250 through, for example, connecting rods 236*a*-236*c*, representatively referred to herein as connecting rod(s) 236. Mechanical interface 250 is both the recipient and provider of mechanical energy on behalf of compressor/motor 200. In compressor mode process 170, for example, the working fluid is compressed by way of work done on an external shaft (not illustrated) coupled to mechanical interface 250, The work done on the external shaft is, in turn, imparted to crankshaft 252 as mechanical energy, which is ultimately stored as compressed working fluid in accumulator 215, minus, of course, thermodynamic and system losses. Subsequently, in motor mode process 180, expansion of the stored working fluid is converted to mechanical energy through crankshaft 252, which can be transferred to the aforementioned external shaft to do work.

Exemplary timing drive 240 is coupled to mechanical interface 250 to synchronize the motion of pistons 232 with the opening and closing of valves in valve system 220, as will be described in detail below. Timing drive 240 is illustrated in FIG. 2 as an assembly of gears, representatively illustrated by gear 245, and a timing shaft 242, but the present invention is not so limited. Numerous timing drive configurations may be constructed, such as from a suitable assembly of gears, pulleys, belts, camshafts, etc., and still remain true to the spirit of the present invention. With similarity to timing techniques for internal combustion engines, exemplary timing drive 240 translates the position of crankshaft 252 to an assignment of valve states, i.e., opened or closed, for valves installed on fluid processing stages 235. However, there are key differences between the timing considerations for compressor/motors embodied in accordance with the present invention and those for internal combustion engines. The first and most obvious difference is that there is no combustion; the power stroke that follows combustion in typical gasoline engines is achieved in embodiments of the present invention by releasing a previously compressed volume of the working fluid into the cylinders of the fluid processing stages 235. Additionally, in that compressor/motor 200 operates both as a compressor and as a motor, synchronization timing between forward and reverse processes must be carefully reconciled, which is not an issue with internal combustion engines.

Each cylinder 234 may formed or installed thereon one or more cylinder ports 226a-226f, representatively referred to herein as cylinder port(s) 226, through which working fluid may be supplied or expelled. Cylinder ports 226 are interconnected in a timed sequence by the aforementioned valve states.

Valve system 220 is a network of valves and/or fluid switches that are interconnected through piping system 210c. A key responsibility of valve system 220 is to ensure unidirectional transport of the working fluid from one cylinder port 226 to another, where the direction of the transport is dictated by the process of the energy recovery cycle that is active at the time of that transport. As used herein, unidirectional fluid transport refers to a trajectory on a thermodynamic state of the working fluid and not a trajectory in space. A unidirectional fluid path, as used herein, is a physical fluid path on which the trajectory of the thermodynamic state (e.g., pressure, volume, temperature) is substantially unidirectional. Such a path may traversed over fluid path segments from one cylinder port to another between path-adjacent fluid processing stages 230, i.e., the fluid processing stages 230 between which the working fluid is directly transferred to arrive at the next incremental state on the trajectory. It is to be understood that "path-adjacent" fluid processing stages 230 need not be physically adjacent or even in proximity to one another, although they often are for purposes of efficiency and compactness.

Figure 3:
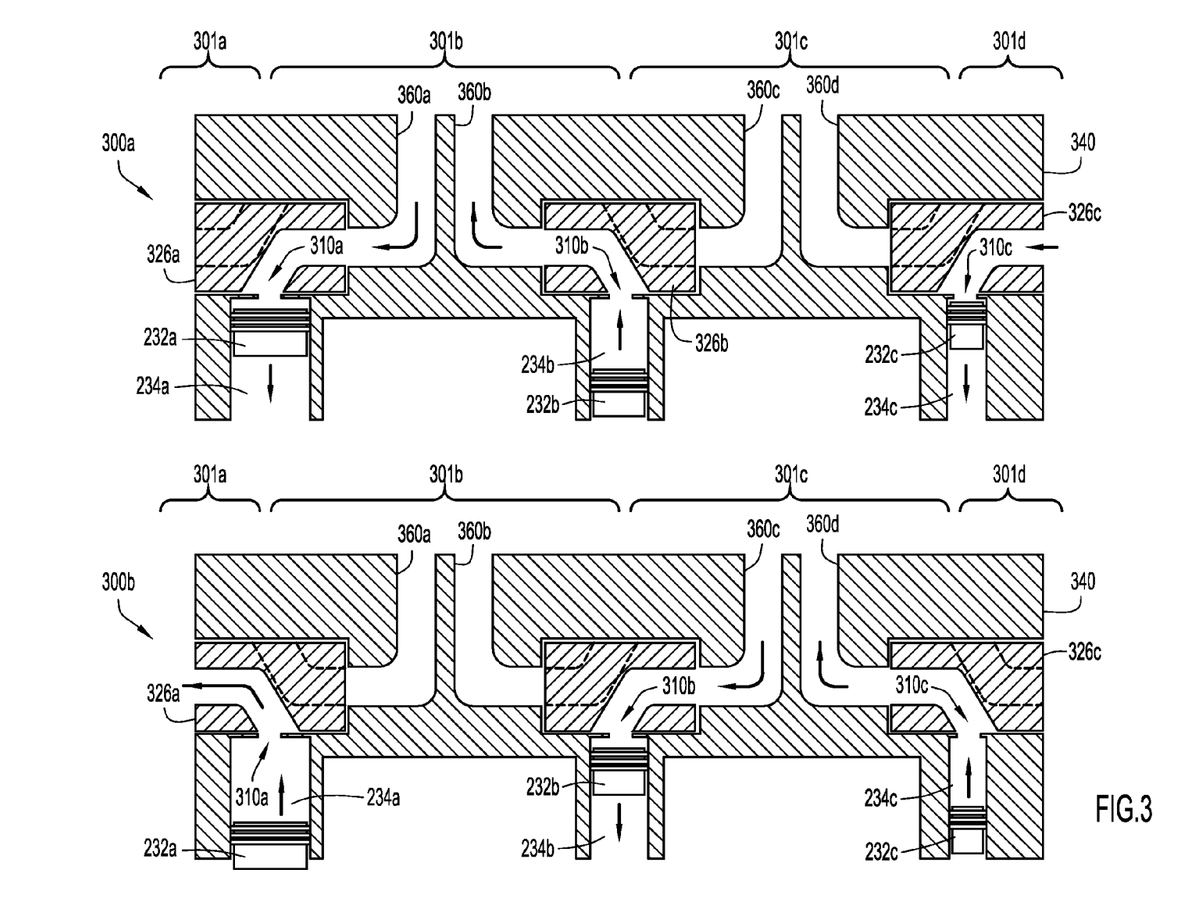
FIG. 3 is a diagram of a valve configuration for a compressor/motor by which the present general inventive concept can be embodied.

FIG. 3 is a diagram of an exemplary valve configuration for compressor/motor 200 by which the present general invention can be embodied. It is to be understood that FIG. 3 is a simplified view of an embodiment that, by way of only a few moving parts, is particularly suitable for describing cooperating mechanisms of embodiments of the present invention. In total, FIG. 3 depicts a complete compression/expansion cycle, not to be confused with an energy recovery cycle, defined by a complete rotation of crankshaft 252. Valve system 220, here embodied as rotary valves 326a-326c and representatively referred to herein as rotary valve(s) 326, is installed in compressor/motor block 340 and selectively opens and closes fluid path segments 301a-301d between fluid processor stage ports 310a-310c, representatively referred to herein as fluid processor stage port(s) 310 or, in this case where the fluid processor stages are piston/cylinder configurations, cylinder ports 310, and working fluid supply service piping 210c.

Rotary valves 326 may be synchronized by timing drive 240 to assure that each piston 232 is in a state, relative to the other pistons 232, that assures the fluid flow is unidirectional. At state 300a, pistons 232a and 232c are in respective down-strokes, while piston 232b is stroking upwards. This configuration can represent an expansion cycle, in which compressed fluid is arriving at port 310a and its expansion is driving piston 232c downward, ultimately providing power to crankshaft 252. Alternatively, FIG. 3 may represent a compression cycle, in which case at state 300a, low pressure fluid is arriving at port 310c and is being drawn in by piston 232c under power provided to crankshaft 252 and transferred to rotary valves 326 through various gears, pulleys, tubes, etc. of timing drive 240. This duality is indicative of thermodynamic reversibility; the closer that the forward and reverse processes are to following the same process path, that much greater is the efficiency in terms of energy recovery. Certain embodiments of the present invention, such as that illustrated in FIG. 3, compel fluid flow over the same physical fluid paths in both forward and reverse processes as part of an overall energy recovery framework that mimics thermodynamic reversibility.

To continue, it will be assumed without loss of generality that FIG. 3 depicts an expansion cycle by which the energy of the compressed fluid stored in accumulator 215 is converted into mechanical energy that rotates crankshaft 252. As piston 232c is driven downward under the force of the expanding fluid in cylinder 234c, piston 232a is also being driven downward as fluid expands in cylinder 234a. The combined force of the down-strokes of pistons 232a and 232c on crankshaft 252 drive piston 232b upward. The fluid that occupied cylinder 234b in the previous expansion cycle, i.e., prior to state 300a, has expanded and the temperature of the fluid dropped as a result of that expansion. The fluid in cylinder 234b is compelled by the upward stroke of piston 232b out of cylinder port 310b, through open rotary valve 326b and out heat exchanger port 360b. As this occurs, fluid that has been heated by, for example, heat exchanger 260a arrives through heat exchanger port 360a and is compelled through open rotary valve 326a and into cylinder 234a through cylinder port 310a. The upward stroke of piston 232b and the downward stroke of piston 234a are synchronized, along with the downward stroke of piston 234c, so that the fluid in fluid path segment 301b flows in only on one direction (with the exception of unavoidable non-laminar flow anomalies). The skilled artisan will recognize and appreciate that such synchronization is achieved by proper configuration of timing drive 240 and all of the system components and parameters on which that configuration depends, e.g., gear/belt ratios in timing drive 240, the angular separation of cranks on crankshaft 252, the channel shape of rotary valves 326, etc. It should be understood and appreciated as well that, as with an internal combustion engine, the timing for compressor/motor 200 may also rely on measurable system state specifications associated with various components and parameters for establishing proper timing, e.g., the positions of all of the valves when a particular piston is a certain number of degrees before or after top-dead-center.

In FIG. 3, state 300b follows state 300a by a half-rotation of crankshaft 252. As is illustrated in the figure, rotary valves 326a and 326b have closed fluid path segment 301b, and rotary valves 326b and 326c have opened fluid path segment 301c. While this occurred, pistons 232 continued on their respective trajectories in accordance with the rotation of crankshaft 252. At the point in time illustrated as state 300b, pistons 232a and 232c are in an upstroke and piston 232b is stroking downward. The volume of fluid in cylinder 234c has expanded to the extent possible given the limits on the stroke of piston 232c, and its temperature has fallen by way of that expansion. Piston 232b, having just expelled the fluid from cylinder 234b, is positioned to receive heated fluid from heat exchanger 260b, which is transported into cylinder 234b while piston 232c makes its upward stroke, by which the contents of cylinder 234c are compelled through cylinder port 310c, open rotary valve 326c and out heat exchanger port 360d. As the working fluid arriving from heat exchanger 260b expands in cylinder 234b, the downward thrust on piston 232b is transferred to crankshaft 252 and, in turn, transferred to piston 232a. The upward stroke of cylinder 232a transports the fluid in cylinder 234a through cylinder port 310a and rotary valve 326a, where it is ejected from compressor/motor 200 at low pressure.

Returning to FIG. 2, valve system 220 may be implemented as sets of diverse purpose-specific valves, as opposed to valves of a common type, to define separate physical flow paths for compression and expansion processes, referred to herein as split path energy recovery processing. For purposes of distinction, embodiments that carry out forward and reverse processes on the same fluid path, such as that illustrated and described with reference to FIG. 3, are said to implement common path energy recovery processing. As previously mentioned, maintaining forward and reverse processes on a common path may result in the highest efficiency. However, doing so may not be achievable in all cases and the present invention is not limited to only high efficiency implementations.

In FIG. 2, exemplary valve system 220, for purposes of describing split path processing, comprises a set of compression path valves 222a-222f, representatively referred to herein as compression path valve(s) 222, and a set of expansion path valves 224a-224f, respectively referred to herein as expansion path valve(s) 224. These valves also define unidirectional fluid paths, although these fluid paths may be defined on separate and distinct flow path segments depending on the active process of the energy recovery cycle. Compression path valves 222 and expansion path valves 224 may be communicatively coupled to fluid processing stages 235 through one or more ports in respective cylinders 234.

Figure 4:
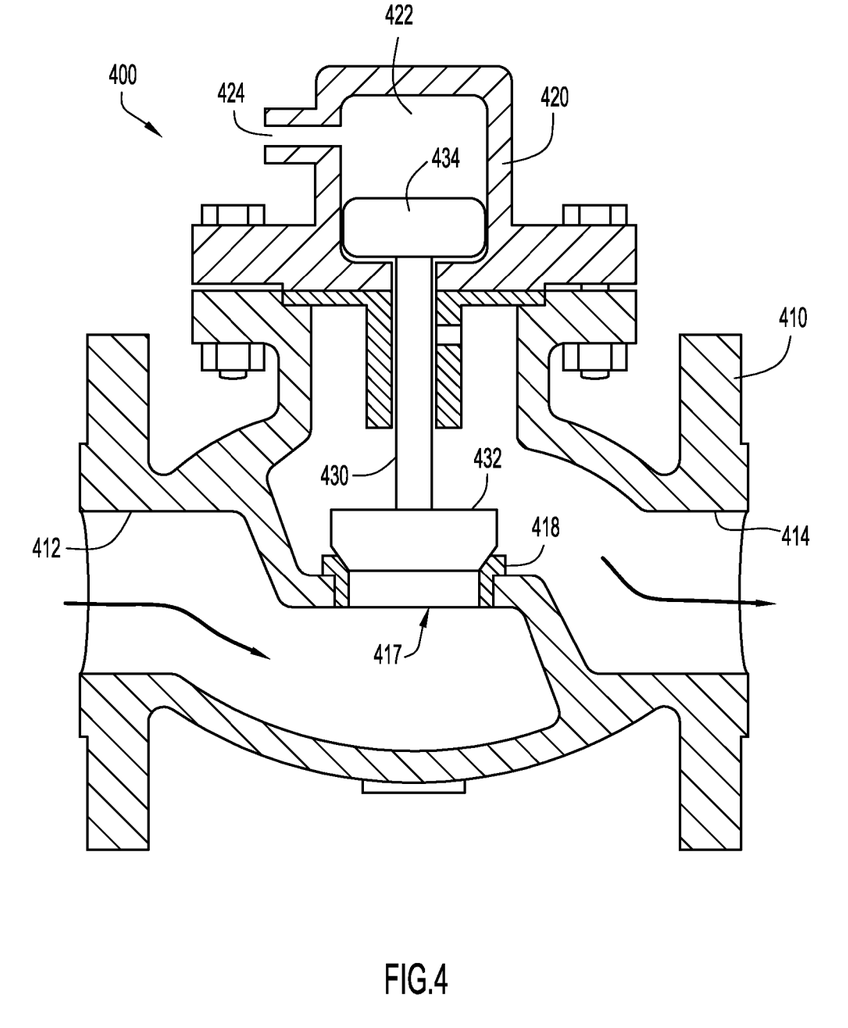
FIG. 4 is a diagram illustrating a compression circuit valve as implemented in embodiments of the present general inventive concept.

FIG. 4 is a cross-sectional illustration of an exemplary check valve 400 that may be used in embodiments of the present invention to implement compression valves 222. Check valve 400 has a valve body 410 in which a pair of fluid channels 412 and 414 are formed. Channels 412 and 414 are in fluid communication through a coupling port 417 around which a valve seat 418 is attached. A valve stem 430 is installed in valve body 410, which has at one end a valve stop 432 that rests on valve seat 418. As is typical with such check valves, check valve 400 allows fluid flow from fluid channel 412 to fluid channel 414 only when the fluid pressure in fluid channel 412 is greater than that in fluid channel 414. When such condition occurs, the pressure in fluid channel 412 overcomes the force applied by the pressure in fluid channel 414 that holds valve stop 432 against valve seat 418. Consequently, the fluid in fluid chamber 412 lifts valve stop 432 off of seat 418 and allows the fluid to flow from fluid chamber 412 through coupling port 417 and out fluid chamber 414. When the pressure in fluid chamber 412 falls below that in fluid chamber 414, the pressure differential forces valve stop 432 against valve seat 418 thus preventing back flow into fluid chamber 412.

Check valve 400 may be mated with a control actuator 420 in which a piston 434 is installed. Piston 434 may be mechanically coupled to valve stem 430 and may be formed with valve stem 430 as a single piece. Control actuator 420 has a pressure chamber 422 in which piston 434 is positioned, and a control fluid port 424 through which pressurized fluid may be selectively introduced into pressure chamber 422. When sufficient pressure is built in pressure chamber 422, piston 434 is forced towards valve body 410 to hold valve stop 432 against valve seat 418. The control fluid pressure may be selected by design so that when communicated into pressure chamber 422, the force generated on valve stem 430 is greater than the force applied by any pressure that is attainable by the working fluid in fluid chamber 412. While in this state, no fluid flow is allowed through check valve 400.

Figure 5:
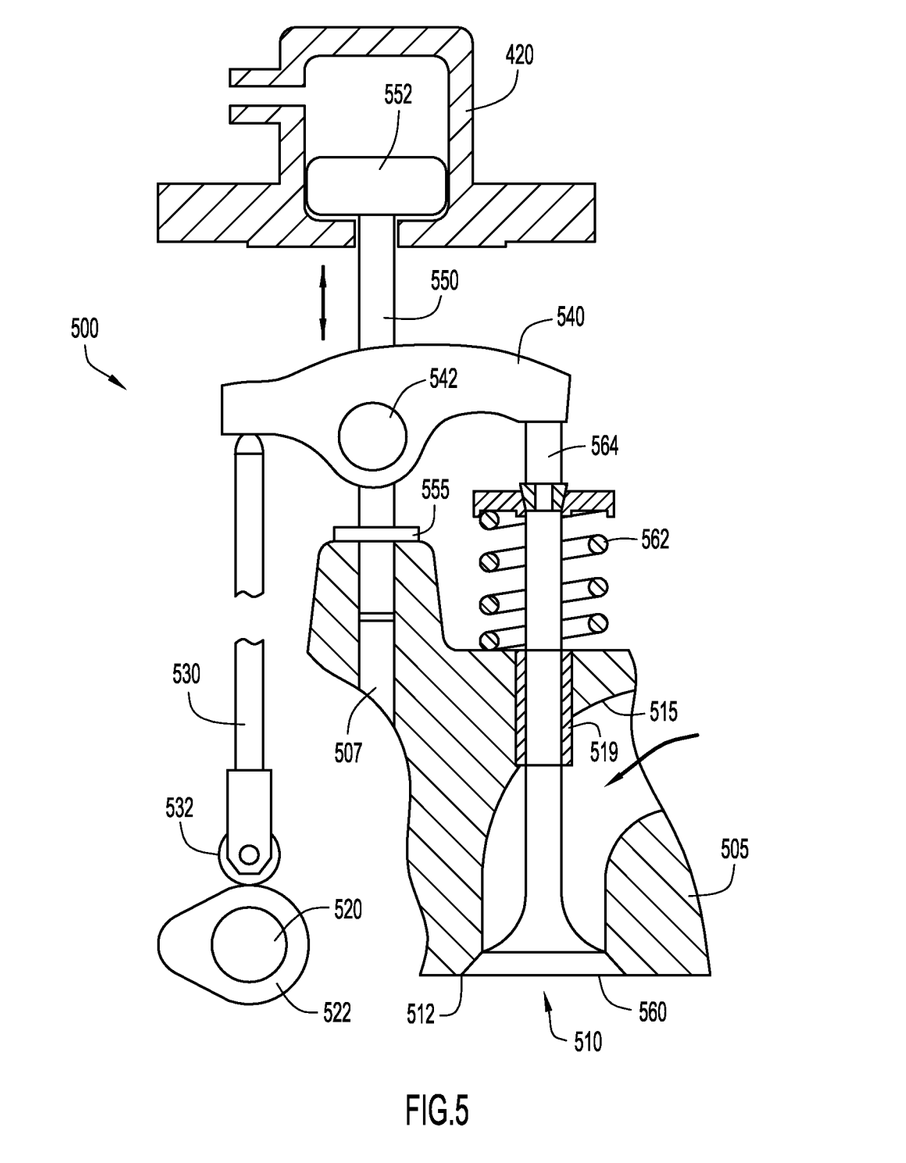
FIG. 5 is a diagram illustrating an expansion circuit valve as implemented in embodiments of the present general inventive concept.

FIG. 5 is a cross-sectional illustration of an exemplary valve assembly 500 that may be used in embodiments of the present invention as expansion valves 222. Valve assembly 500 incorporates a poppet valve 560 in cylinders 224, such as in a cylinder head 505. Cylinder head 505 may have a fluid chamber 515 formed therein that is in fluid communication with cylinder 224 through a cylinder port 510. Poppet valve 560 terminates cylinder port 510 on valve seat 512 formed on cylinder head 505 and is held in place through a biasing force delivered by valve spring 562. The motion of poppet valve 560 is constrained by valve guide 519.

Exemplary valve assembly 500 includes a rocker arm 540 that pivots on a pin 542 mechanically coupled to control rod 550. One end of rocker arm 540 is placed on valve stem 564 of poppet valve 564 and the opposite end of rocker arm 540 is coupled to follower rod 530. A wheel 532 on follower rod 530 rides against a cam 522 on camshaft 520.

Valve assembly 500 may include a control actuator 420 that may be implemented by the same actuator type as that discussed above with reference to FIG. 4. In the absence of pressure in control actuator 420, control rod 550 is held in guide bore 507 only by the weight of the components to which it is attached through pin 542. The eccentric surface of cam 522 is carried through follower rod 530 and onto rocker arm 540. In that the weight of the components attached to control rod 550 is insufficient to hold pin 542 in a fixed position, the motion of the follower rod 530 on cam 522 serves only to lift and then drop rocker arm 540 using valve stem 564 as a fulcrum. Control rod 550 slides in and out of guide bore 507 with this motion. Upon control fluid entering the pressure chamber of control actuator 420 and applying pressure to piston 552, control rod 550 is forced towards cylinder head 505. Control rod 550 is thus held firmly in guide bore 507 by way of a stop 555, at a predetermined position that establishes the proper pivot location for pin 542. The pressure in control actuator 420 is by design sufficient to oppose the lifting force of follower rod 530 and to hold pin 542 in place against the additional biasing force of valve spring 562. Accordingly, the cycle of cam 522 is carried through the follower rod 530 to rotate rocker arm 540 about pin 542 and to force poppet valve 560 away from valve seat 512. Subsequently, working fluid is allowed to flow through cylinder port 510 in a direction corresponding to the role of valve assembly 500 at the cylinder on which it is installed.

Returning again to FIG. 2, it is to be assumed, for purposes of description and not limitation, that a suitably configured check valve 400, e.g., one similar to that illustrated and described with reference to FIG. 4 is installed as each of the compression path valves 222 and that a suitably configured valve assembly 500, e.g., one similar to that illustrated and described with reference to FIG. 5, is installed as each of expansion path valves 224. Accordingly, each fluid processor stage 235 is fitted with two check valves 400 and two valve assemblies 500 on respective cylinder ports 226. In the description that follows, the reference numerals for the valves of valve system 200 will follow the illustration in FIG. 2, but the valve nomenclature used in FIGS. 4 and 5 will be used in association with the corresponding reference numerals of FIG. 2.

Exemplary control system 270 utilizes compressed fluid in accumulator 215 as the control fluid described in FIGS. 4 and 5. In the illustrated example of FIG. 2, compressed fluid from accumulator 215 is provided to a regulator 272 and, solely for purposes of distinction, only the fluid after regulator 272 is considered the control fluid. The control fluid is provided to a pneumatic controller 276 that pressurizes either, both or none of a compression valve pneumatic control circuit 273 or an expansion valve pneumatic control circuit 275. The selection of the activated pneumatic control circuit 273, 275 may be made in response to an electrical control signal 202 that may be provided by a central controller, such as that described below, to pneumatic control interface circuit 274. Interface circuit 274 may include suitable components, such as one or more solenoids, to operate one or more valves in pneumatic controller 276 and ultimately pressurize the corresponding pneumatic control circuit 273, 275. For example, when signal 202 indicates that compressor/motor 200 is to operate in a compression cycle, pneumatic controller 276 may ensure that both pneumatic control circuits 273, 275 are depressurized by removing pressure from all control actuators in valve system 200. Accordingly, check valves 222 operate normally, i.e., constraining a unidirectional flow, and the rocker arms in valve assemblies 224 are disengaged from the camshaft, which, in this example, is driven by timing drive shaft 242. On the other hand, when signal 202 indicates that compressor/motor 200 is to operate in an expansion mode process, both control circuits 273, 275 are pressurized, as are the pressure chambers of the control actuators in all valves of valve system 200. In this state, check valves 222 are placed in a locked state in which fluid flow through check valves 222 is rigidly inhibited. The rocker arms of valve assemblies 224 are also locked in position and, accordingly the rocker arms operate the poppet valves in accordance with the valve timing established by the rotation of timing shaft 242.

In the valve configuration described in the preceding paragraphs, fluid transport between cylinders proceeds in a manner similar to that described with reference to FIG. 3. That is, the downward stroke of one piston 232 in one fluid processing stages 235 is met with an upward stroke of the piston 232 of the path-adjacent fluid processing stage 235 thereby forming a unidirectional fluid processing path across check valves 222 by which the volume of the fluid enters through one cylinder port 226 and a smaller volume of the working fluid is transferred through another cylinder port 226 to the path-adjacent fluid processing stage 235. However, in this new configuration, the compression fluid path is decoupled, at least explicitly, from timing drive 240. As a consequence, the valve through which a particular fluid processing stage is to expel its contents is not made open in advance of such expulsion, as would occur in a properly timed valve configuration. Instead, fluid processing stage 226 utilizes the fluid that it is transferring to push the check valve open. While this departure is in a direction away from thermodynamic reversibility, and thus less efficient, the check valve compression path may be easier to implement than the fully-timed alternative, and the minor inefficiency introduced by decoupling timing drive 240 is often easily outweighed by the savings of cost in system implementation and maintenance.

The expansion mode process fluid path is defined through the poppet valves of valve assemblies 224 under timing constraints of timing drive 240. With the exception of the valve type, this path is essentially identical to the expansion fluid path described with reference to FIG. 3, where the opening and closing of poppet valves from one cylinder port to the next is timed in a manner equivalent to the rotations of the rotary valves.

Figure 6:
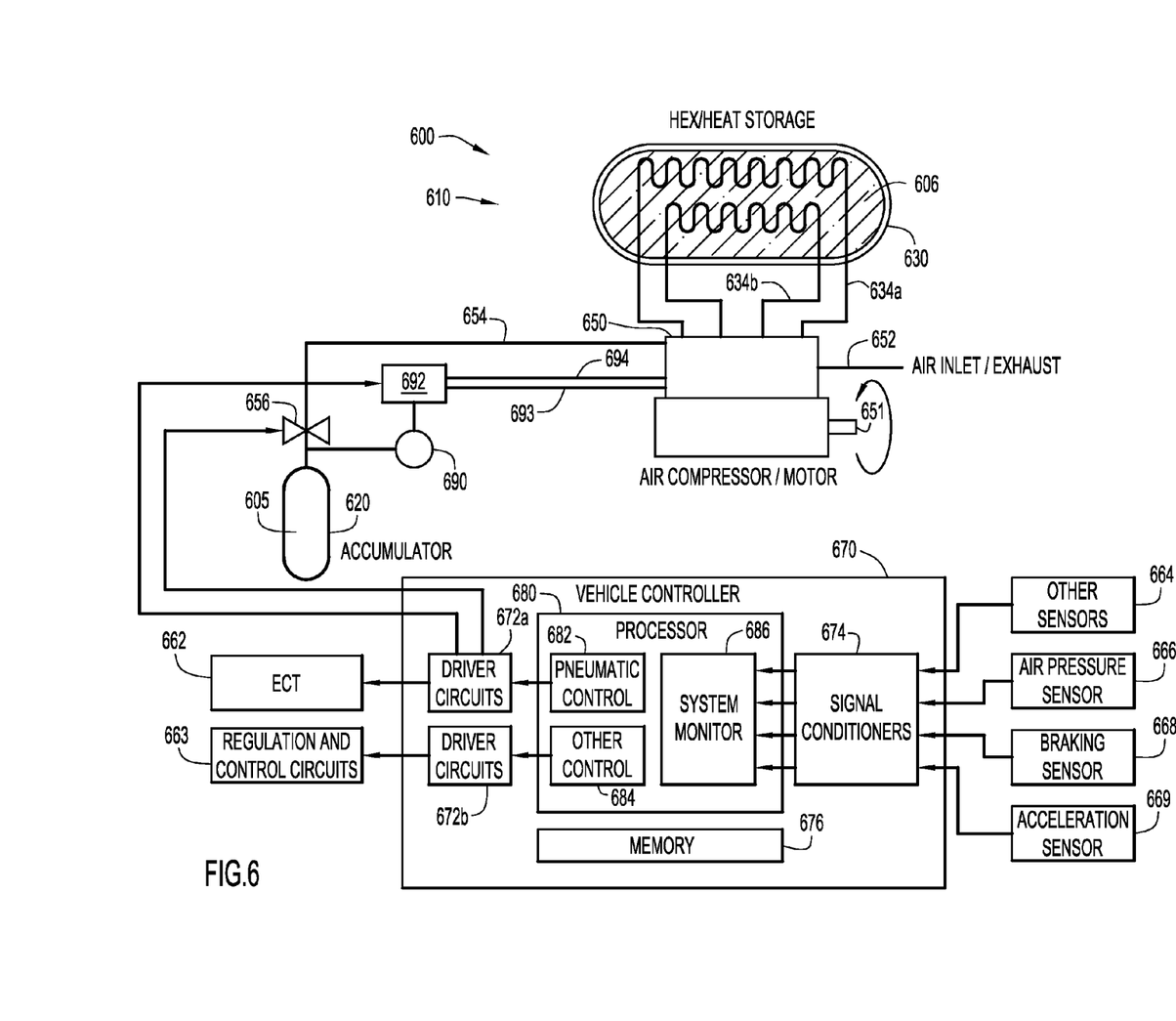
FIG. 6 is a schematic block diagram of a hybrid vehicle drive context in which the present general inventive concept can be embodied.

FIG. 6 is a schematic block diagram of an embodiment of an energy recovery system 610 with a compressor/motor 650 of the present invention incorporated into a pneumatic drive system 600 of a hybrid vehicle (not illustrated). In the exemplary pneumatic drive system 600, the working fluid is air 605 and water is used as a heat transfer fluid 606 in heat exchange (HEX)/storage vessel 630, although the present invention is not restricted to these fluids. An accumulator vessel 620 stores compressed air, which serves as an energy storage medium. In certain embodiments, the air pressure in accumulator 620 can range from about 500 psig (about 3.447 MPa) to about 6,000 psig (about 41.37 MPa) or 8,000 psig (about 55.16 MPa), but the present invention is not limited to these ranges.

A plurality of intercooler heat exchange tubes 634a and 634b, representatively referred to herein as heat exchange tube(s) 634, traverse the wall of HEX/storage vessel 630 to be placed in thermal contact with water 606 therein. Heat exchange tubes 634 may be suitably constructed for efficient heat exchange, such as by implementing fins, coils, meanderings, or other structures that increase the surface area over which heat conduction transfers heat between air 605 in heat exchange tubes 634 and water 606 within HEX/storage vessel 630.

As previously stated, pneumatic drive system 600 is incorporated in an energy recovery system 610 of a hybrid vehicle. It is to be understood that the operational details of the vehicle in which pneumatic drive system 600 is incorporated is not essential to understanding the role of energy recovery system 610 in that vehicle. However, description of certain functions of the vehicle are believed useful, particularly since the energy recovery cycle that pneumatic drive system 600 implements, i.e., regenerative braking, relates to operations of the vehicle that initiate those processes. Briefly, shaft 651 of compressor/motor 650 may be coupled to the main drive shaft (not illustrated) by means of an electrically-controlled clutch/transfer drive (ECT) 662 that is controlled by vehicle controller 670 in the vehicle's electrical system 660. ECT 662 is an abstraction of several devices that may be used to mechanically couple compressor/motor 650 with the drive shaft of the vehicle on demand and to make any speed or torque conversions between shaft 651 and the vehicle drive shaft. Again, the implementation details of coupling compressor/motor 650 to the vehicle drive train are not essential to practice the present invention. ECT 662 is engaged for the compressor mode during braking and for the motor mode for acceleration, subject to certain conditions, such as the availability of a sufficient amount of compressed air.

Vehicle electrical system 660 includes a number of sensors, a number of regulation and control circuits and a vehicle controller 670. The sensors may include an air pressure sensor 666 that monitors the air pressure in accumulator 620, a braking sensor 668 that generates a signal when the vehicle's brake pedal is depressed to a certain level, an acceleration sensor 669 that generates a signal when the vehicle's accelerator pedal is depressed to a certain level, and other sensors 664 that monitor other vehicle functions. Control mechanisms may include an electrically operated air valve 656, ECT 662, pneumatic controller 692 and pneumatic control lines 694 and 693, as well as other regulation and control circuits 663 that operate various system components by way of control signals generated by vehicle controller 670. Vehicle controller 670 may include signal conditioning circuits 674 that, among other things, filter incoming signals and convert analog signals to digital data signals, and various drive circuits that, among other things, convert where necessary digital data signals into analog signals and amplify and buffer the electrical signals provided to the various regulation and control circuits. Vehicle controller 670 may also include a processor 680, which may be implemented in fixed or programmable logic including, but not limited to, application specific circuits, programmable logic arrays, microprocessors and microcontrollers. Memory 676 may provide storage for process data and, when processor 680 is a programmable microprocessor, processor instructions that when executed, perform various monitoring and control functions. Processor 680 may execute, either by fixed circuitry or by executing program code, system monitoring process 686 that continuously monitors available sensors for various conditions, pneumatic control process 682 that operates pneumatic drive system 600 and other control functions 684 to operate other various vehicle subsystems.

In operation, the hybrid vehicle may be operated as would any vehicle be operated. Inevitably, the vehicle operator will have to brake and, if the pressure on the brake pedal is above a certain threshold, as determined from braking sensor 668 and system monitor 686, then pneumatic drive system 600 is operated into the compressor mode and compressor mode process 170 may be initiated. Pneumatic control process 682 may generate a signal that operates ECT 662 to mechanically couple shaft 651 of compressor/motor 650 to the vehicle drift shaft and, when so embodied, a signal to pneumatic controller 692 to depressurize the control actuators in valve system 220. In response, ambient air is drawn into compressor/motor 650 through inlet 652 and compressed in stages through fluid transport segments defined by the rotary valves (or check valves) as described with reference to FIG. 3. Pneumatic control process 482 may generate an additional signal that operates valve 656 into a state that allows air flow into accumulator 620 but not in the opposite direction. As air 605 is compressed, it passes through intercooler heat exchange tubes 630a and 630b, and heat is transferred to water 606 in HEX/storage vessel 630. The fully compressed air exits compressor/motor 650 through pressurized air line 654, through valve 656 and into accumulator 605.

In keeping with regenerative braking principles, the braking of the vehicle is achieved by transferring energy from the vehicle's drive train to do work on compressor/motor 650 by way of shaft 651. Accordingly, certain embodiments of the invention may determine, such as from the pressure on and duration over which the brake pedal is depressed, whether to engage, either partially, fully or not at all, the friction brakes of the vehicle.

At some point, vehicle controller 670 will terminate the regenerative braking and with it compressor mode process 180. This may occur when the brake pedal is released, when maximum air storage capacity is reached, or other conditions per the vehicle's design. Accordingly, pneumatic control process 682 may generate a signal to close valve 656 so that air can neither enter nor exit accumulator 620. Additionally, pneumatic control process 682 may generate another signal to disengage the vehicle drive from compressor/motor shaft 651 by way of deactivating ECT 662. Pneumatic drive system 600 will remain in this standby state until another braking event or until an acceleration event initiates a motor mode process 180.

At some point during vehicle operation, added power may be desired, such as when greater acceleration is called for. Accordingly, the vehicle operator may depress the accelerator pedal and a signal indicative of such will be generated by acceleration sensor 669. System monitor 686 may determine if certain conditions are met prior to initiating motor mode process 180, such as the manner in which the accelerator pedal was depressed, e.g., how rapidly and how far the pedal is depressed, and whether sufficient air is stored to meet the acceleration demand. The amount of pressurized air in accumulator 620 may be monitored by air pressure sensor 666. If all of the necessary conditions are met, processor 680 may initiate motor mode process 180. Pneumatic control process 682 may generate a signal to couple the vehicle's drive train to compressor/motor shaft 651 by engaging ECT 662. Pneumatic control process 682 may generate additional signals to operate valve 656 into an open position that allows air 605 to flow out of accumulator 622, but not into accumulator 622, and to pressurize pneumatic control lines 693, 694 with control fluid obtained through regulator 690. In response, air 605 flows out of accumulator 622, through valve 656 and air line 654, and into compressor/motor 650. Air 405 in compressor/motor 650 expands across the different fluid processing stages under control of timed valve operations, e.g., rotary valves or the poppet valves, of valve system 220, as described with reference to FIG. 3, to rotate shaft 651. Air 605 traverses the stages through heat exchange tubes 434, where heat may be transferred from heated water 606 in HEX/storage vessel 630 to air 605 in heat exchange tubes 634. The decompressed air exits compressor/motor 650 at exhaust port 652. Upon termination of the acceleration event, either by, for example, removing pressure from the accelerator pedal or by virtue of insufficient air pressure to continue, motor mode process 180 is terminated by closing valve 656 and disengaging compressor/motor shaft 651 from the vehicle's drive train, such as by deactivating ECT 662.

Figure 7:
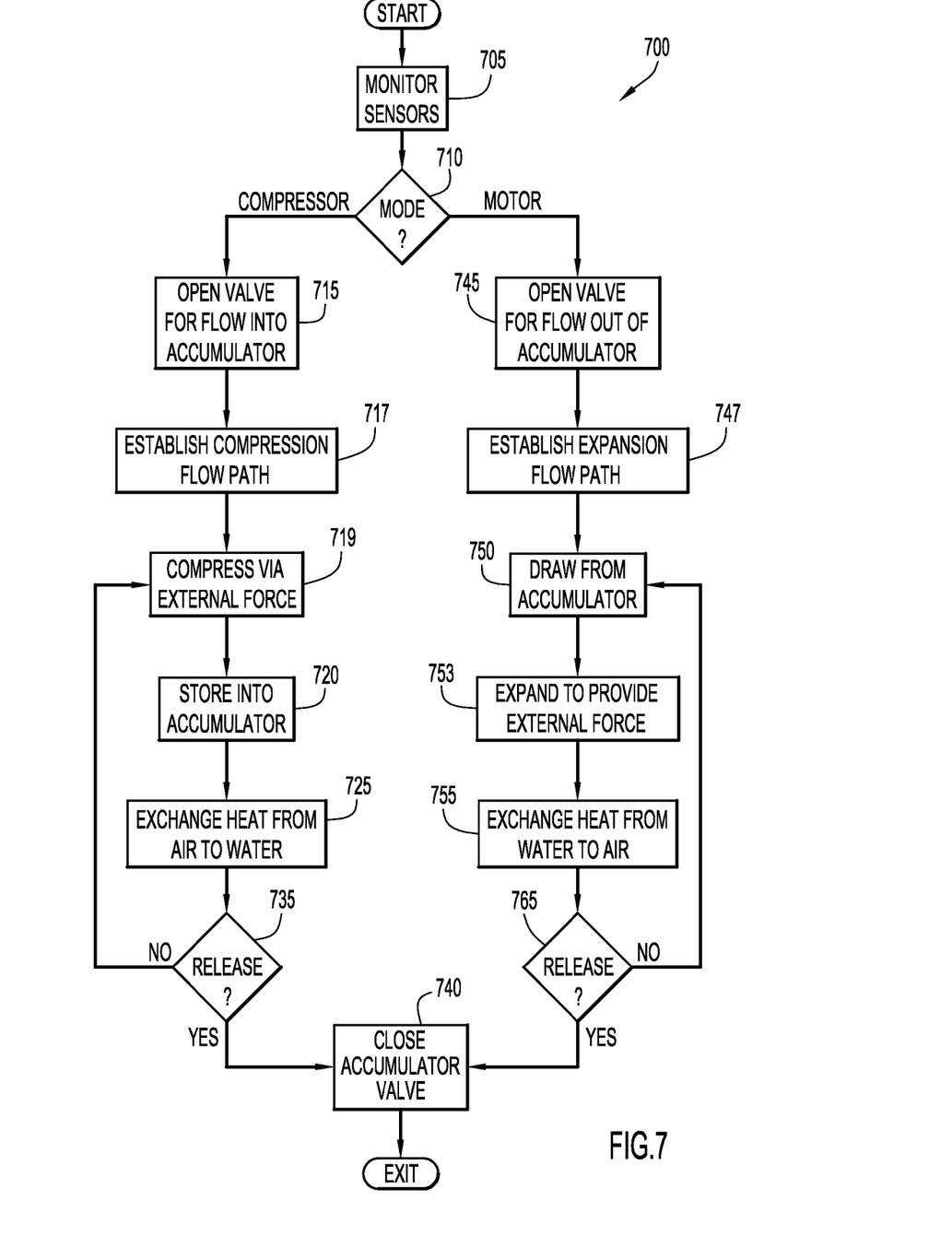
FIG. 7 is a flow diagram of an energy recovery process by which the present general inventive concept can be embodied.

FIG. 7 is a flow diagram of energy recovery process 700 by which the present invention can be embodied, which again assumes air as the working fluid and water as the heat storage fluid. In operation 705, sensors are monitored various system conditions and/or events. In operation 710, it is determined whether criteria are met for either compressor mode process 170 or motor mode process 180. In the case of compressor mode, energy recovery process 700 transitions to operation 715, where a valve governing the flow into and out of an air storage accumulator is opened to allow air to flow into the accumulator. In operation 717, the compression flow path is selected, such as by releasing pressure from control actuators and, in operation 719, work is done on the compressor/motor shaft to drive the compression process and store compressed air into the accumulator, which occurs by operation 720. In operation 725, heat from the air to the water in the heat exchanger and in operation, 735, it is determined whether the compressor mode process is released, i.e., has completed to the extent required by system conditions, and, if not, work continues to be done on the compressor/motor input/output shaft at operation 720. If on the other hand the compressor mode process has been released, the air valve to the accumulator is closed in operation 740.

If, in operation 710, it is determined that system conditions meet criteria for motor mode operation, the accumulator valve is opened in operation 745 to allow air flow out of the accumulator and the expansion flow path is established, such as by, when not implemented in the reversible implementation of FIG. 3, pressurizing the control actuators in the valves of valve system 220. Air is drawn from the accumulator in operation 750 and is allowed to expand over the fluid processing stages in operation 753. In operation 755, heat is exchanged in the heat exchanger from the water to the air and in operation 765, it is determined whether the motor mode process is released and, if so, the accumulator valve is closed in operation 740. If the motor mode process is not released, air continues to be drawn from the accumulator at operation 750.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An apparatus comprising:
a plurality of fluid processing stages, each having an internal chamber and one or more ports through which a fluid is accepted into the chamber and expelled from the chamber;
a plurality of valves communicatively coupled to the ports of the fluid processing stages through which the fluid is accepted into each of the chambers as a volume and expelled from each of the chambers as another volume that is other than the volume in which the fluid is accepted;
a plurality of conduit segments interconnecting the valves of the respective fluid processing stages to define, in one process of a cycle, a fluid path through the fluid processing stages and defining, in another process of the cycle, a reverse fluid path through the fluid processing stages;
one or more heat exchangers in communication with a heat storage medium through which all of the conduit segments between the valves pass;
a mechanical interface mechanically coupled to the fluid processing stages such that, during the one process, a force is conveyed to the fluid processing stages that compels the fluid through the fluid path and that, during the other process, the force is conveyed from the fluid processing stages that is compelled by the fluid traversing the reverse fluid path; and
a timing drive mechanically coupled to the mechanical interface and to the valves to operate the valves in a sequence that, during the process, the fluid path is unidirectional such that the other volumes of the fluid expelled from respective path-adjacent fluid processing stages are made incrementally smaller over the fluid path and to operate the valves in another sequence that, during the other process, the reverse fluid path is unidirectional such that the other volumes of the fluid expelled from the respective path-adjacent fluid processing stages become incrementally larger over the reverse fluid path.

2. The apparatus of claim 1, wherein the timing drive synchronizes the valves so that the conduit segments are open between only those path-adjacent fluid processing stages that are in relative states by which only unidirectional flow of the fluid can occur while the fluid path segment is open.

3. The apparatus of claim 2, wherein the relative states are positions of actuators in the path-adjacent fluid processing stages that compel transport of the fluid over the conduit segments.

4. The apparatus of claim 1, wherein the valves comprise a set of compression path valves defining the fluid path such that the fluid is transported between the ports of the path-adjacent fluid processing stages independently of the timing drive.

5. The apparatus of claim 4, wherein the compression path valves are check valves.

6. The apparatus of claim 4, wherein all of the valves other than the compression path valves define the other fluid path and are synchronized by the timing drive.

7. The apparatus of claim 6, wherein the valves other than the compression path valves are poppet valves.

8. The apparatus of claim 6 further comprising a control circuit coupled to the valves and configured to:
disengage the valves other than the compression path valves from the timing drive during the process of the cycle.

9. The apparatus of claim 1 further comprising an accumulator to accept the other volume from a terminal one of the fluid processing stages on the fluid path and to furnish the volume of the fluid to a terminal one of the fluid processing stages on the reverse fluid path.

10. The apparatus of claim 1, wherein each of the fluid processing stages has a single port to which a corresponding valve is communicatively coupled.

11. The apparatus of claim 10, wherein the valves that define the fluid path through the fluid processing stages are the same valves that define the reverse fluid path through the fluid processing stages.

12. The apparatus of claim 11, wherein the valves are rotary valves.

13. The apparatus of claim 1, wherein the one or more heat exchangers is a heat exchanger containing a heat storage medium through which all of the conduit segments between the valves commonly pass.

14. The apparatus of claim 13, wherein the heat exchanger absorbs heat from the fluid as the fluid traverses the fluid path and stores the heat absorbed from the fluid as thermal energy to increase the temperature of the fluid as the fluid traverses the reverse fluid path.

15. An apparatus comprising:
a compressor/motor block;
a plurality of fluid processing stages mechanically supported in the compressor/motor block, each of the fluid processor stages having an internal chamber and one or more ports through which a fluid is accepted into the chamber and expelled from the chamber;
a plurality of valves communicatively coupled to the ports of the fluid processing stages through which the fluid is accepted into each of the chambers as a volume and expelled from each of the chambers as another volume that is other than the volume in which the fluid is accepted;
a plurality of conduit segments interconnecting the valves of the respective fluid processing stages to define, in one process of an energy recovery cycle, a fluid path through the fluid processing stages and defining, in another process of the energy recovery cycle, a reverse fluid path through the fluid processing stages;
one or more heat exchangers in communication with a heat storage medium through which all of the conduit segments between the valves pass;
a crankshaft mechanically coupled to the fluid processing stages through the compressor/motor block that, during the one process, conveys a force to the fluid processing stages that compels the fluid through the fluid path and that, during the other process, conveys the force from the fluid processing stages that is compelled by the fluid traversing the reverse fluid path; and
a timing drive mechanically coupled to the crankshaft and to the valves to operate the valves in a sequence that, during the process, the fluid path is unidirectional such that the other volumes of the fluid expelled from respective path-adjacent fluid processing stages are made incrementally smaller over the fluid path and to operate the valves in another sequence that, during the other process, the reverse fluid path is unidirectional such that the other volumes of the fluid expelled from the respective path-adjacent fluid processing stages become incrementally larger over the reverse fluid path.

16. The apparatus of claim 15, wherein each of the fluid processing stages includes:
   a cylinder bored into the compressor/motor block to define the chamber; and
   a piston positioned in the cylinder and displaceable therein, wherein the crankshaft is mechanically coupled to the piston in each of the fluid processing stages.

17. The apparatus of claim 16, wherein the timing drive synchronizes opening and closing the valves with rotation of the crankshaft so that the valves are open between only those path-adjacent fluid processing stages in which the piston is in a stroke position.

18. The apparatus of claim 15 further comprising an accumulator to accept the other volume from a terminal one of the fluid processing stages on the fluid path and to furnish the volume of the fluid to a terminal one of the fluid processing stages on the reverse fluid path.

19. The apparatus of claim 15, wherein the one or more heat exchangers is a heat exchanger containing a heat storage medium through which all of the conduit segments between the valves commonly pass.

* * * * *